United States Patent Office 3,597,194
Patented Aug. 3, 1971

3,597,194
ALLOY FOR BRAZING POWDER
Ronald Savage, Harrow, Middlesex, England, assignor to The International Nickel Company, Inc., New York, N.Y.
No Drawing. Filed Aug. 13, 1969, Ser. No. 849,880
Claims priority, application Great Britain, Aug. 27, 1968, 40,890/68
Int. Cl. C22c 5/00, 19/00; B23k 1/04
U.S. Cl. 75—134N        8 Claims

ABSTRACT OF THE DISCLOSURE

Brazing alloy contains nickel, palladium and zirconium in proportions providing characteristics of crushability to powder form and good adhesion for brazing ceramics and metals.

---

The present invention relates to nickel-palladium-zirconium alloys and more particularly to nickel-palladium-zirconium alloys useful for producing brazing powders.

It is well known that in the production of ceramic-to-ceramic or ceramic-to-metal joints it is desirable to use brazing alloys of palladium and nickel and it is further known that presence of zirconium in such alloys leads to especially good adhesion. It is also known that brazing alloys can be used in sheet form or in powder form (with or without other materials, e.g., vehicles, binders, fluxes), if available in such forms; but, it is difficult to produce zirconium-containing brazing alloys that are workable into sheet. As disclosed in U.S. Pat. No. 3,438,770, it is possible to produce workable nickel-palladium-zirconium alloys if the composition is specially controlled so that the alloys contain by atomic percent from 20 to 65 palladium (23% to 75% Pd by weight) and from 1.5 to 9 zirconium (1.7% to 10.5% Zr by weight) with the balance being nickel. However, even these alloys are undesirably difficult to work.

The difficulties involved in working alloys into sheet form for use as brazing materials are of course avoided if the alloys are melted and solidified, then comminuted (crushed, milled, pulverized, etc.) to powder and used as brazing powders. However, we have found that the zirconium-containing alloys described in the aforementioned U.S. patent cannot be easily comminuted to powder because they are not brittle enough.

There has now been discovered a nickel-palladium-zirconium alloy having satisfactory characteristics for comminution into powder form and for use in brazing ceramics and metals.

It is an object of the present invention to provide a nickel-palladium-zirconium alloy having satisfactory characteristics for production of brazing powders.

Another object of the invention is to provide a brazing material for making brazed joints to ceramics.

A further object of the invention is to provide a process for making brazing materials.

It is also an object of the invention to provide a process for production of brazed joints.

Other objects and advantages will become apparent from the following description.

Generally speaking the present invention contemplates an alloy containing 12% to 23% zirconium by weight, 23% to 75% palladium by weight with the balance being essentially nickel (thus, 2% to 65% nickel by difference). All alloy composition percentages or proportions set forth herein are by weight except where expressly stated otherwise. The alloy of the invention can be comminuted to powder and used as a brazing powder to produce brazed joints, particularly including ceramic-to-ceramic joints and ceramic-to-metal joints. It is especially advantageous to have the ratio of palladium to nickel in the alloy be about 3:2 (by weight).

The alloy can be made by arc-melting methods employing protection against oxidation, e.g., by arc-melting with a tungsten electrode and a copper hearth in a neutral atmosphere such as an argon atmosphere. Comminution of the alloy to powder form can be accomplished by crushing and milling, e.g., by impact crushing and then reducing to a very fine size by ball milling. For use in making brazed ceramic-to-ceramic or ceramic-to-metal joints the alloy is comminuted to powder of fine particle size less than about 50 microns. This comminution can be accomplished by crushing the alloy in a percussion mortar to particles passing through a 60-mesh British Standard Sieve (BSS) screen, that is to say to less than about 250 microns particle size, and thereafter ball milling the particles to pass through a 300-mesh BSS screen (53 micron aperture). The powder can be incorporated in a liquid vehicle to provide a slurry which can be painted on ceramic and metal surfaces to be brazed together to produce ceramic-to-ceramic or ceramic-to-metal joints. Advantageously the particle size is reduced by milling to a very fine powder size of the order of about 1 micron to prepare a brazing paint containing the finely powdered alloy for coating surfaces to be brazed. The alloy should be protected against oxidation during comminution. For instance, the alloy is comminuted by milling in a liquid vehicle that is protective to minimize oxidation of the zirconium in the alloy. It is further contemplated that the alloy be milled in a liquid vehicle that serves dual functions of protection against oxidation and providing a brazing paint vehicle, or component thereof, when producing a brazing paint comprising the alloy of the invention.

In carrying the invention into practice it is advantageous that the alloy of the invention contain palladium and nickel in a palladium to nickel ratio by weight (Pd:Ni ratio) of at least 1:1 and not greater than 2:1 in order to obtain the advantageous characteristic of a low melting point.

Amounts of impurities and/or auxiliary elements which can be present in the alloy without serious detriment include copper up to 5%, iron up to 5%, cobalt up to 5%, lanthanum up to 5% and niobium up to 5%.

On the other hand, to avoid unsatisfactory results, care is taken to ensure that the alloy does not contain more than 2% titanium.

In any event the total of the percentages of any elements present other than nickel, palladium and zirconium does not exceed 5% of the alloy.

An example of the alloy of the invention is an alloy containing 51% palladium, 34% nickel and 15% zirconium. It is to be noted that this composition containing 51% palladium and 34% nickel has an advantageous Pd:Ni ratio of about 3:2.

Brazed joints can be made by heating the alloy of the invention while in contact with the joint and protected by a nonoxidizing atmosphere, e.g., a hydrogen atmosphere, at temperatures in the range of 2260° F. to 2380° F.

Liquid vehicles suitable for production of brazing paints that can be used in applying the alloy to the joint in preparation for brazing include inter alia acetone.

During comminution of the alloy to fine powder the alloy can be protected against oxidation with liquids such as for example xylene or propyl-alcohol.

The invention is particularly applicable in the production of brazed joints between articles of ceramics and/or metals, including alumina jointed to the controlled expansion alloys having the broad composition 36–50 nickel, balance iron; or alumina to alumina, or the said alloys to themselves.

I claim:

1. An alloy consisting essentially of 12% to 23% zirconium, 23% to 75% palladium and balance essentially nickel.

2. An alloy as set forth in claim 1 wherein the ratio of the palladium content to the nickel content is at least 1:1 and not greater than 2:1.

3. An alloy as set forth in claim 1 wherein the ratio of the palladium content to the nickel content is about 3:2.

4. A brazing powder comprising an alloy as set forth in claim 1 in the form of powder characterized by a particle size of less than 50 microns.

5. A powder as set forth in claim 4 characterized by a particle size of the order of about 1 micron.

6. In the process for producing brazed metallic joints between ceramic or metallic articles, the improvement which comprises using as the brazing material a powder of an alloy consisting essentially of 12% to 23% zirconium, 23% to 75% palladium and balance essentially nickel and characterized by a particle size of less than 50 microns.

7. A process as set forth in claim 6 wherein the palladium and the nickel in the alloy are in proportions of a palladium:nickel ratio of at least 1:1 and not greater than 2:1.

8. A process for producing a brazing material comprising providing an alloy consisting essentially of 12% to 23% zirconium, 23% to 75% palladium and balance essentially nickel, comminuting the alloy to a particle size of less than 50 microns and incorporating the alloy and a brazing paint vehicle into a slurry.

References Cited

UNITED STATES PATENTS

| | | | |
|---|---|---|---|
| 2,159,809 | 5/1939 | Lenz et al. | 75—170X |
| 2,814,571 | 11/1957 | Iverson | 75—.5X |
| 2,872,309 | 2/1959 | Bolkcom | 75—134 |
| 2,900,251 | 8/1959 | Evans et al. | 75—134X |
| 3,070,875 | 1/1963 | Feduska | 75—172X |
| 3,277,150 | 10/1966 | Rhys et al. | 75—170X |
| 3,438,770 | 4/1969 | Clark et al. | 75—172X |

OTHER REFERENCES

German Auslegeshrift No. 1,092,212; Walter; 11–1960.

HENRY W. TARRING II, Primary Examiner

U.S. Cl. X.R.

75—170, 172, 0.5BB, 134F; 29—504